J. LANE, Jr.

Plow.

No. 6,405. Reissued April 27, 1875.

WITNESSES:

P. C. Dieterich

H. C. Scott

INVENTOR,

John Lane Jr.

per C. H. Watson & Co.

ATTORNEYS.

THE GRAPHIC CO. PHOTO-LITH. 39 & 41 PARK PLACE, N.Y.

UNITED STATES PATENT OFFICE.

JOHN LANE, JR., OF CHICAGO, ILLINOIS, ASSIGNOR TO HAPGOOD & CO., AND FURST & BRADLEY.

IMPROVEMENT IN PLOWS.

Specification forming part of Letters Patent No. 113,436, dated April 4, 1871; reissue No. 6,405, dated April 27, 1875; application filed July 28, 1874.

*To all whom it may concern:*

Be it known that I, JOHN LANE, Jr., of Chicago, in the county of Cook and State of Illinois, have invented certain new and useful Improvements in Plows; and I do hereby declare that the following is a full, clear, and exact description thereof, reference being had to the accompanying drawings, and to the letters of reference marked thereon, which form a part of this specification:

My invention relates to that class of plows in which the plow has its wearing surface of steel; and it consists in a plowshare, provided with a vertical portion on the outer side of the land-side bar, and said vertical portion extended under the point of said bar, forming a socket on the point of the forward end of the share; and also in the construction and combination of parts, as hereinafter more fully set forth.

Figure 1:
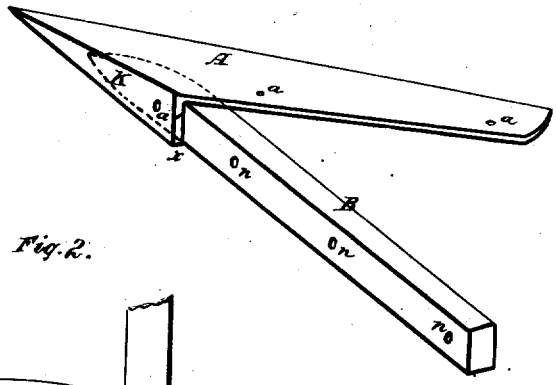
Figure 2:
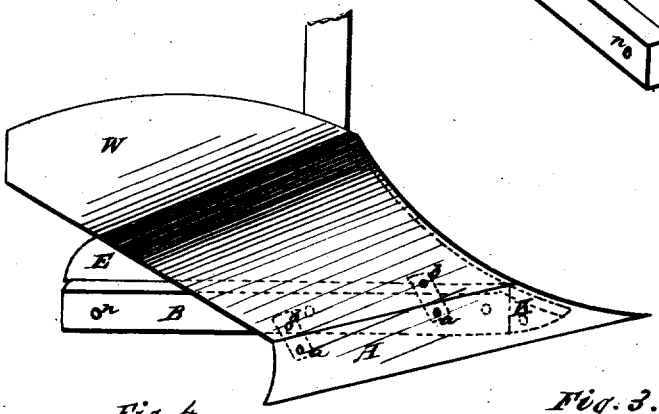
Figure 4:
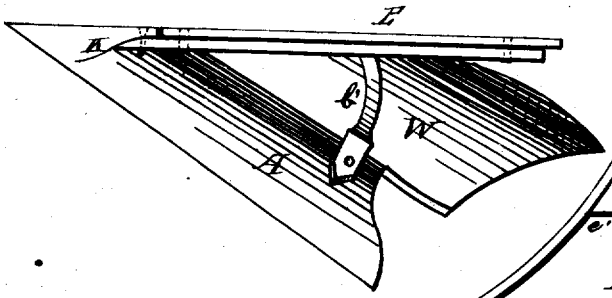
Figure 3:
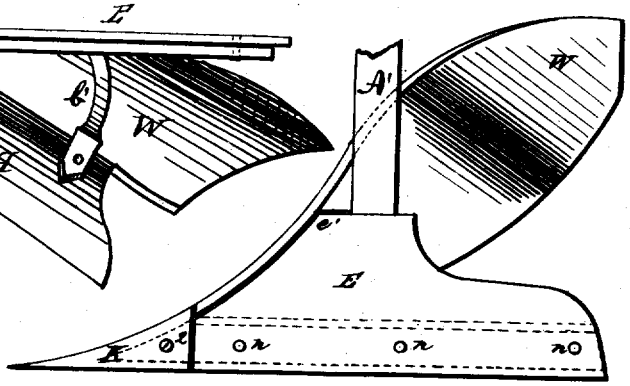

In the annexed drawing, Figure 1 is a perspective view of a plowshare and land-side bar detached from the land-side-bar facing and mold-board. Fig. 2 is a view of the mold-board side of the plow. Fig. 3 is a view of the land-side of the plow; and Fig. 4 is a bottom view of the plow.

A′ represents the plow-standard. A is the plowshare; B, the land-side bar; E, the land-side-bar facing; and W the mold-board. The plowshare A is, at its forward end, provided with a flange, K, extending vertically downward, and forming a vertical shoulder, *x*, directly from the upper edge of the share. From the lower edge of the vertical flange K a horizontal flange, *w*, connects it with the body of the share, thus forming a socket on the point of the forward end of the share. Into this socket the pointed forward end of the land-side bar B is inserted and fastened to the flange K by a bolt at Z, forward of the upper edge of the share. By the socket thus formed, and the insertion of the land-side bar therein, the plow is more strongly supported at the point than could otherwise be the case. The facing E is secured to the bar B by screw-bolts or rivets at *n*, and its forward end rests against the shoulder *x* at the back end of flange K. The mold-board W is secured in position by bolts or rivets at *b b*, through lugs or connecting-bars, to which the share A is also bolted at *a a*. More or less bolts, rivets, or lugs may be used, and they may be in any position securing the parts together.

I am aware that a plowshare has been made with a vertical flange on the outside of the land-side bar, and extending a considerable distance in rear of the upper edge of the share, and I do, therefore, not claim such as my invention. By that construction of the share the land-side-bar facing had to be correspondingly cut out, rendering it very expensive, and the parts had to be made expressly with a view to be used with each other.

By my construction of the flange, forming a vertical shoulder directly from the upper edge of the share, the land-side-bar facing abutting against said vertical shoulder, the parts may be manufactured at considerably less cost, and are easily exchanged when required.

Having thus fully described my invention, what I claim as new, and desire to secure by Letters Patent, is—

1. The share A, having vertical portion K and under portion *w*, forming a socket perforated at *a′*, and the vertical portion forming a shoulder on a line with the upper edge of the same, substantially as and for the purpose set forth.

2. The share A, having vertical portion K, ending on a line with the upper portion of the share, and the land-side E, ending with a vertical shoulder against the rear portion of the part K, the vertical portion of the share A and the land-side attached, by bolts *a′* and *n*, directly to the bar B, furnishing the entire support, all combined as and for the purpose herein specified.

3. The share A, having the vertical portion K, with perforation *a′* forward of the upper edge of the share, in combination with the land-side E and bar B, bolted together at *n n*, substantially as and for the purpose set forth.

In testimony that I claim the foregoing, I have hereunto set my hand this 21st day of July, 1874.

JOHN LANE, JR.

Witnesses:
C. H. WATSON,
WILL MULOC.